April 17, 1956     C. D. BOCK     2,742,604
ELECTROMECHANICAL RESOLVERS
Filed April 25, 1951
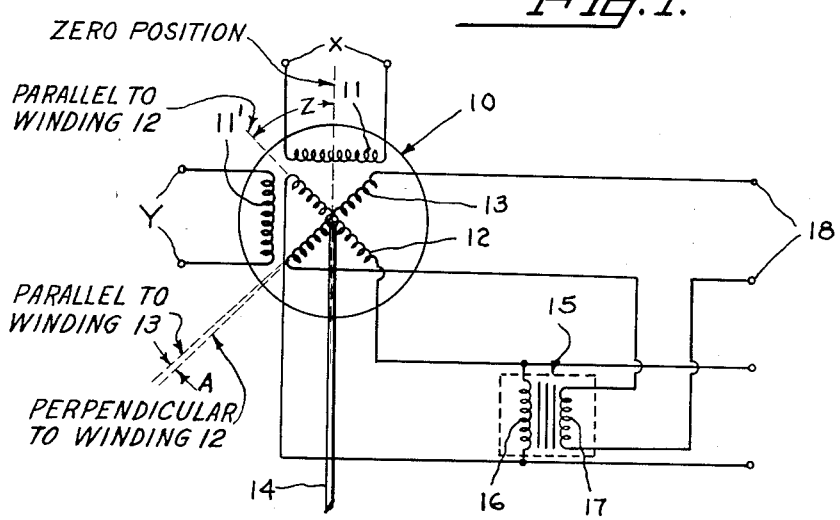
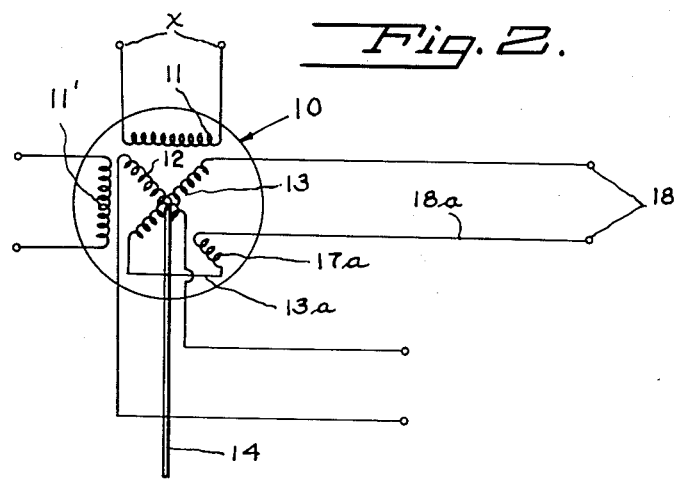
INVENTOR.
CHARLES D. BOCK
BY *Raymond A. Paquin*
ATTORNEY.

United States Patent Office 2,742,604
Patented Apr. 17, 1956

2,742,604
ELECTROMECHANICAL RESOLVERS

Charles Dickens Bock, New York, N. Y., assignor to American Bosch Arma Corporation, a corporation of New York Application April 25, 1951, Serial No. 222,918

3 Claims. (Cl. 323—48)

This invention relates to electromechanical resolvers and correction means therefor which compensate for errors arising from secondary winding obliquity.

The electrical resolver is essentially an electrical transformer in which two mutually perpendicular secondary windings are inductively coupled to and rotatable relatively to either one primary winding, or preferably to two perpendicularly disposed primary windings. The magnetic axes of the secondary windings are nominally mutually perpendicular so that the voltage induced to one secondary winding, i. e. the reference secondary, by one primary winding is proportional in magnitude to the primary excitation voltage and $\cos \theta$, where $\theta$ is the angular displacement between the magnetic axis of the reference secondary winding and the magnetic axis of the primary winding, while the voltage induced in the other secondary winding is proportional in magnitude to the product of the magnitude of the primary excitation voltage and $\sin \theta$.

When the magnetic axes of the secondary windings are not mutually perpendicular, i. e. the axis of the reference secondary winding is inclined to the axis of the other or inclined secondary winding, the voltage induced in the inclined secondary winding is not exactly proportional to $\sin \theta$ and a correction must be applied to the output of the inclined secondary winding.

In accordance with the present invention errors due to the secondary axis obliquity are corrected by subtracting a voltage equal to the product of the sine of the axis error displacement angle and the output of the resolver reference secondary winding from the output of the resolver inclined secondary winding. This voltage is supplied by a transformer whose primary winding is connected across the resolver reference secondary winding while the transformer secondary winding is connected in series with the output of the resolver inclined secondary winding.

In one modification of this invention, a third secondary winding is contained within the resolver, having its axis parallel to axis of the reference secondary winding, but electrically connected in series with the inclined secondary winding. The relative strength and direction of the third secondary winding output is adjusted by varying the turns in the third secondary winding, until the desired degree of compensation is obtained.

For a more complete understanding of this invention reference may be had to the accompanying diagrams, Figs. 1 and 2, which illustrate the corrective means used to compensate for the effects of secondary axis obliquity.

In Fig. 1 a resolver 10, having a pair of perpendicularly disposed primary windings 11, 11' and a pair of substantially perpendicularly disposed secondary windings 12, 13 on the rotor, has the rotor displaced from the defined zero position, by shaft 14, through an angle Z. In the defined zero position the axis of secondary winding 12 is parallel to the axis of primary winding 11', so that with excitation voltages proportional in magnitude to X and Y applied to primary windings 11 and 11' respectively and a displacement of shaft 14 through an angle Z, the voltage $E_{12}$ induced in secondary winding 12 is proportional to $$Y \cos Z + X \sin Z$$

When the axes of secondary windings 12 and 13 are displaced from perpendicularity by a small error angle, A, the voltage $E_{13}$ induced in rotor winding 13 is proportional to $$X \cos (Z-A) - Y \sin (Z-A)$$

instead of the ideal value of $X \cos Z - Y \sin Z$, when $A=0$.

By trigonometric expansion and collection of terms, $E_{13}$ may be expressed as $(X \cos Z - Y \sin Z) \cos A + (X \sin Z + Y \cos Z) \sin A$.

Since the angle A is small, cos A is very nearly equal to unity and $E_{13}$ is essentially proportional to $$X \cos Z - Y \sin Z + (X \sin Z + Y \cos Z) \sin A$$

In order to make the output voltage of rotor winding 13 proportional to the ideal value, $X \cos Z - Y \sin Z$, transformer 15 is connected as indicated where the primary winding 16 is energized by the output voltage of rotor winding 12 of resolver 11, and the secondary winding 17 is connected in series with resolver stator winding 13 and terminals 18. The transformation ratio of transformer 15 is chosen equal to sin A so that the amplitude of the output voltage of secondary winding 17 is proportional to $(X \sin Z + Y \cos Z) \sin A$. The amplitude of the voltage at terminals 18, is equal to the algebraic difference between the amplitude of the voltage $(X \cos Z - Y \sin Z) + (X \sin Z + Y \cos Z) \sin A$ from rotor winding 13 and the voltage $(X \sin Z + Y \cos Z) \sin A$ from secondary winding 17 and is therefore proportional to $X \cos Z - Y \sin Z$, the corrected output of rotor winding 13.

Fig. 2 shows a modification of the circuit of Fig. 1 in which the external transformer 15 is replaced by the additional secondary winding 17a connected in series with secondary winding 13 but having its magnetic axis aligned with the magnetic axis of secondary winding 12. The magnitude of the output voltage of winding 17a may be adjusted by choosing the number of turns included between lead 13a (from winding 13 to winding 17a) and lead 18a, one of the output leads, while the direction of the voltage of secondary winding 17a with respect to the voltage of secondary winding 13 may be changed by reversing the leads 13a and 18a at winding 17a, so that the voltage output winding 17a is exactly proportional to $(X \sin Z + Y \cos Z) \sin A$ and the voltage at terminals 18 is proportional to $(X \cos Z - Y \sin Z)$.

From the foregoing it will be seen I have provided means for obtaining all of the objects and advantages of the invention.

I claim:

1. In a device of the character described, a pair of substantially mutually perpendicular secondary windings, a primary winding inductively coupled to said secondary windings, transformer means having a primary winding connected across one of said secondary windings and a secondary winding connected in series with the other of said pair of secondary windings, said transformer means compensating for errors arising from secondary winding obliquity.

2. In a device of the character described, a pair of substantially mutually perpendicular secondary windings, said pair of secondary windings being displaced from perpendicularity by an error angle, a primary winding inductively coupled to said secondary windings, transformer means having a primary winding connected across one of said secondary windings and a secondary winding connected in series with the other of said pair of secondary windings, said transformer means having a transformation ratio equal to the sine of said error angle and compensating for errors arising from secondary winding obliquity.

3. In a device of the character described, a pair of substantially mutually perpendicular secondary windings, said pair of secondary windings being displaced from perpendicularity by an error angle, one of said secondary windings being a reference winding and the other of said windings being the inclined winding, a primary winding inductively coupled to said secondary windings, transformer means having a primary winding connected across one of said secondary windings and a secondary winding connected in series with the other of said pair of secondary windings, said primary winding of said transformer means being connected to said reference winding and said inclined winding being connected to the secondary winding of said transformer means for compensating for errors arising from secondary winding obliquity.

References Cited in the file of this patent

UNITED STATES PATENTS 2,455,672     Greenough _____ Dec. 7, 1948